United States Patent Office 3,225,896
Patented Dec. 28, 1965

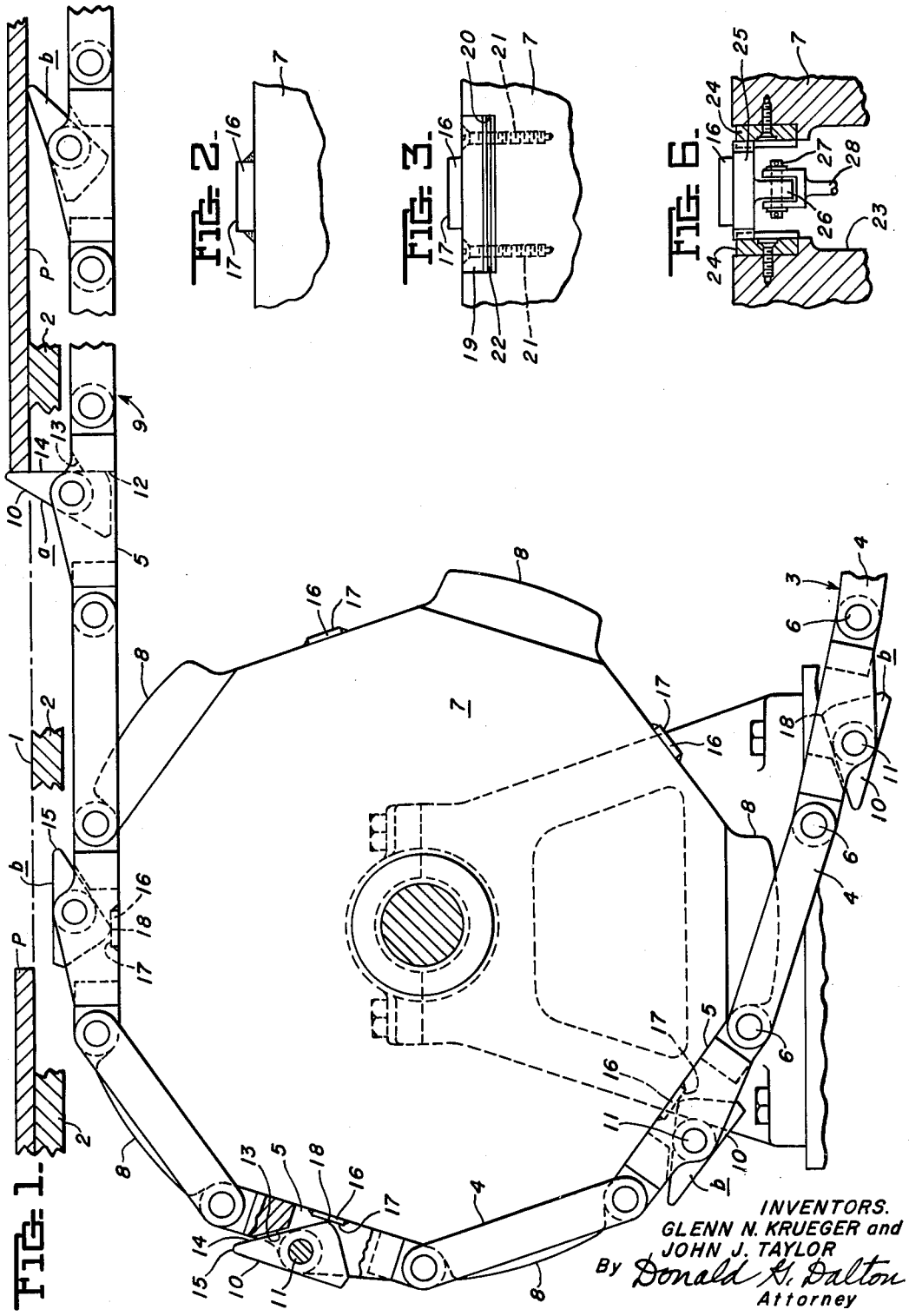

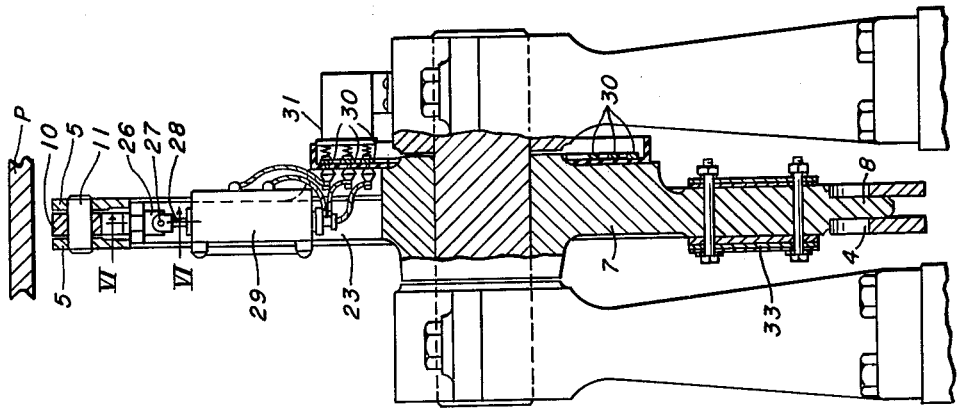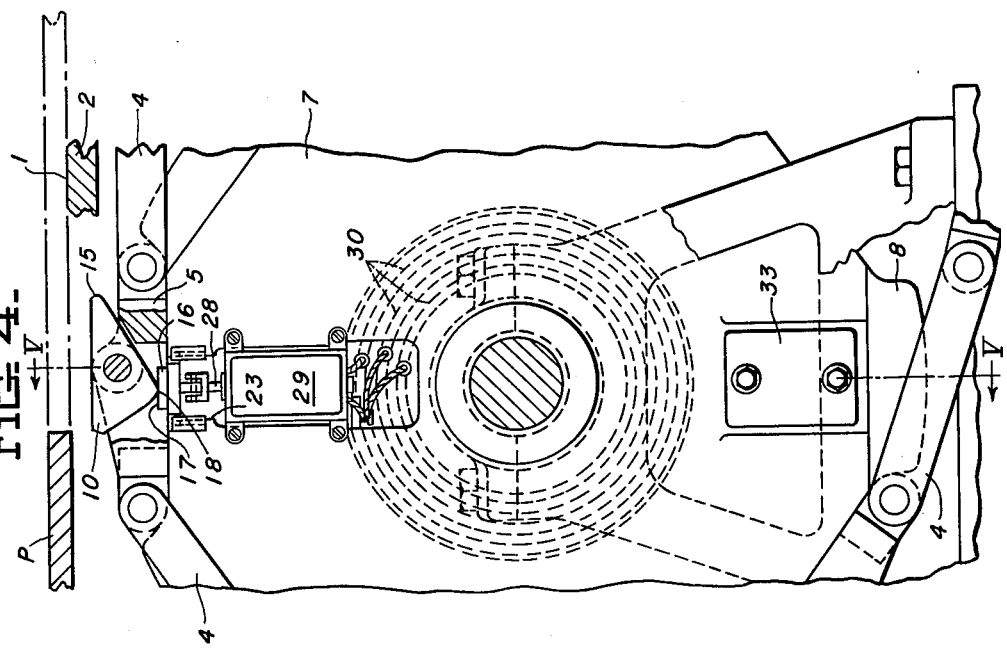

3,225,896
POSITION CONTROL DEVICE FOR CONVEYOR CHAIN DOGS
Glenn N. Krueger, North Riverside, and John J. Taylor, Orland Park, Ill., assignors to United States Steel Corporation, a corporation of New Jersey
Filed Feb. 19, 1963, Ser. No. 259,512
2 Claims. (Cl. 198—170)

This invention relates to conveyor dogs of the counterweighted type and, more particularly, to mechanism for controlling their pivotal movement on a conveyor chain to upright pushing positions.

In conveyors of this type, the dogs pivot to upright pushing positions as they travel upwardly over the chain sprocket at the front of the conveyor. Since this movement is substantially complete before their travel to the top of the sprocket and into the upper flight of the conveyor chain, the dogs move with a raising and scraping action over the bottom surfaces of any articles that may be above the conveyor chain sprocket at the entry end of the conveyor. Engagement of the dogs with articles in this manner may result in damage to the articles or to the conveyor. This is a particularly troublesome problem in pusher dog conveyors used in steel mill operations for transferring hot-rolled plate over cooling bed skids.

To avoid damage of the character mentioned above, conventional conveyors are commonly operated in an intermittent manner to make certain that the pusher dogs do not engage articles that may be positioned over the chain sprockets at the entry end of the conveyor. This in turn requires a minimum spacing of the pusher dogs on the conveyor chain that is substantially greater than the maximum dimension of the articles in the direction of their movement by the conveyor. These requirements of course reduce the amount of material that can be moved by the conveyor.

One of the principal objects of this invention is to provide a pusher dog conveyor that will eliminate article damage of the character mentioned above, and that compared to conventional conveyors will enable closer spacing of the pusher dogs on the conveyor chain, will eliminate the necessity of operating the conveyors intermittently, and will increase the carrying capacity of the conveyor. For these and related purposes, the invention contemplates an apparatus which operates to control the point at which the pusher dogs pivot to their operative pushing positions and, more particularly, operates to hold the pusher dogs against pivotal movement during their travel upwardly over a chain sprocket at the entry end of the conveyor and prior to their movement into the upper run of the conveyor chain.

Other objects and advantages of the invention will become apparent from the following description. In the drawings, there are shown several embodiments of the invention. In this showing:

FIGURE 1 is a fragmentary side elevational view of a pusher dog chain conveyor which is provided with the control mechanism of this invention;

FIGURE 2 is an enlarged fragmentary view of the sprocket of FIGURE 1 that shows in side elevation the preferred embodiment of the invention;

FIGURE 3 is a view similar to FIGURE 2 but illustrating a modified form of adjustable insert for the chain sprocket;

FIGURE 4 is a partial view similar to FIGURE 1 of a modification for electrical operation;

FIGURE 5 is a view taken substantially along the line V—V of FIGURE 4; and

FIGURE 6 is a view taken along the line VI—VI of FIGURE 5.

The drawings show the invention applied to a chain dog conveyor for sliding hot-rolled plate P laterally over horizontal skid surfaces 1 on the upper edges of parallel skids 2 in a cooling bed to which the plate is delivered from a rolling mill. The conveyor comprises a sprocket chain 3 formed of alternately arranged sprocket links 4 and intermediate links 5 connected by pivot pins 6, and a sprocket wheel 7 having circumferentially spaced sprocket teeth 8 for meshing engagement with the sprocket links 4. During operation of the conveyor, the sprocket wheel 7 rotates in a clockwise direction and the upper flight 9 of the conveyor chain travels from left-to-right as viewed in FIGURE 1.

Each of the intermediate links 5 has a pusher dog 10 supported thereon by a pivot 11 for pivotal movement between upright pushing and retracted positions designated respectively by the letters *a* and *b*. In these positions, stop surfaces 12 and 13 on the intermediate links 5 have abutting engagement with side surfaces 14 on the pusher dogs 10 to limit pivotal movement of the dogs beyond the positions *a* and *b*. In addition, the dogs 10 have a counterweighted construction that provides a gravitational bias for pivotal movement to the upright pushing position *a* during movement over the upper flight 9 of the conveyor chain and to the position *b* during movement over the conveyor bottom flight. This construction further allows ducking movement of the dogs 10 to the retracted position *b* to permit over-travel movement of plate P on the skid surfaces 1. As each dog 10 travels upwardly over an arcuate path defined by the sprocket wheel 7, its gravitational bias pivots it to a position with its side surface 14 in abutting engagement with the intermediate link stop surface 12, and this movement is completed in conventionally constructed conveyors before the tips 15 of the dogs are elevated to the level of the skid surfaces 1. As a consequence, the dog tips 15 will engage the bottom surface of any plate lying in the arcuate path of its upward movement and will move over such bottom surface with a scraping and raising action that may damage the plate or the conveyor.

In accordance with the principles of this invention, this relative pivotal movement of each dog 10 from position *b* to position *a* is controlled and prevented during return movement of the dogs 10 from the lower flight to the upper flight 9 of the chain. According to the preferred embodiment of the invention as shown in FIGURE 1, this is accomplished by lugs 16 that project from the periphery of the sprocket wheel 7 at points centrally of the space between adjacent sprockets 8 thereon. The lugs 16 according to a preferred construction are hardened steel pads that are welded to the periphery of the sprocket wheel 7. Each provides a radially outwardly facing surface 17 for abutting engagement with a corner part 18 of a pusher dog 10 to hold it against relative pivotal movement with respect to the conveyor chain as it travels upwardly over the sprocket wheel 7 into the upper flight 9 of the conveyor chain. As each intermediate link 5 begins its arcuate movement upwardly over the sprocket wheel 7, the pusher dog 10 thereon pivots to a position in which its corner part 18 has abutting engagement with a lug surface 17 and is prevented from further pivotal movement toward the position *a* until after the pivot 11 for the dog 10 starts its travel over the horizontal path of the upper flight 9 of the chain 3. As this travel begins, each dog 10 and its pivot pin 11 move horizontally to the right and away from the sprocket wheel 7 as viewed in FIGURE 1, while the lug surface 17 that has been holding it against pivotal movement moves downwardly and allows it to pivot to its upright pushing position *a*. The dogs 10 are thus maintained in the retracted position *b* until their movement over the upper flight 9 is started. If a plate P is positioned over the dog at this time, its bottom surface will hold it in the retracted position b and the dog will ride under the plate. Abutting engagement of the lug surfaces 17 and the dog parts 18 thus operates to hold the dogs 10 from engaging the bottom surface of a plate P positioned over the sprocket 7 with a raising and scraping action.

FIGURE 3 shows a modification in which the lug 16 is detachably secured to the sprocket wheel 7. In this showing, the lug 16 has a base 19 that is fitted in a recess 20 formed in the periphery of the sprocket wheel 7. The base 19 is secured to the sprocket wheel 7 by flat headed cap screws 21. Shims 22 between the base 19 and the bottom of the recess 20 provide for adjustment of the radial positions of the lug surfaces 17 with respect to the sprocket wheel 7.

In the modification shown in FIGURES 4–6, a lug 16 is mounted for radial movement on the sprocket wheel 7 between an operative position as shown in the drawings and a retracted position in which it does not engage and prevent pivotal movement of the dog 10 during movement from the lower flight to the upper flight of the conveyor chain. In this modification, the sprocket wheel 7 has a radially extending opening 23 with guides 24 along the edges of its outer end in which the base 25 of the lug 16 has guided sliding movement. A tongue 26 projecting radially inwardly from the base 25 is connected by a pivot pin 27 to an actuating member 28 that is operated in a radial direction by a solenoid 29. The solenoid 29 is preferably of the type that is effective upon energization to pull the actuating member 28 radially inwardly relative to the sprocket wheel 7 and to thus move the lug 16 to an inoperative retracted position in which its surface 17 is out of the path of movement of the corner 18 of the dog 10. The solenoid 29 further includes a spring (not shown) for biasing the movement of the lug 16 radially outwardly to its operative position. Energization of the solenoid 29 is controlled through collector rings 30 secured to the sprocket 7 for rotation therewith and a stationary brush assembly 31 that is connected to a suitable electrical control circuit. At a point directly opposite the solenoid 29, a counterweight 33 is mounted on the wheel 7 to counterbalance the weight of the solenoid 29. The sprocket wheel 7 may be equipped with a solenoid 29 and movable lug 16 between each adjacent pair of sprocket teeth 8 or with a smaller number as desired. In this arrangement, the lug 16 can be operated at any point in the path of movement of the dogs 10 from the lower flight to the upper flight of the conveyor chain and according to the requirements of the conveyor in which it is used.

From the foregoing, it will be apparent that the lugs 16, in the modifications shown in FIGURES 2 and 3, and in the operative outer position of the modifications shown in FIGURES 5 and 6, operate to prevent movement of the dogs 10 from their retracted positions b to their upright pushing positions a during their travel from the lower flight to the upper flight 9 of the conveyor chain. In this manner engagement of the tips 15 of the dogs 10 with the bottom surfaces of plate P prior to movement of the dogs 10 to the top of the sprocket wheel 7 is effectively prevented, and damage to the plates P or the conveyor due to movement of the tips 15 over the plate bottom surfaces with a lifting and scraping action is eliminated. It will accordingly be further apparent that this enables product to be placed over the sprocket wheel 7 and thus eliminates the necessity of cycling the operation of the conveyor intermittently to prevent pusher dogs 10 from contacting the bottom surfaces of the product and thus causing damage. As a consequence, continuous operation of the conveyor is permitted and an improved flow of product is obtained.

While several embodiments of our invention have been shown and described it will be apparent that other adaptations and modifications may be made without departing from the scope of the following claims.

We claim:

1. In a chain conveyor of the pusher dog type including counterweighted pusher dogs mounted on a conveyor chain for pivotal movement to and from operative pushing positions and a sprocket at one end of said conveyor over which said chain travels, the combination therewith comprising cooperating parts on said sprocket and dogs respectively for preventing pivotal movement of said dogs relative to said chain and sprocket during arcuate movement of the respective portions of said chains on which said dogs are supported over said sprockets, said sprocket part comprising a lug mounted for radial movement on said sprocket from a radially inner and inoperative position to a radially outer operating position in which it is adapted to have abutting engagement with said dog part during movement over said arcuate path, and means for moving said lug to its said operating position.

2. A conveyor mechanism as defined in claim 1 characterized by said last-named means comprising an electrical solenoid.

References Cited by the Examiner

UNITED STATES PATENTS

| 929,232 | 7/1909 | Linderman | 198—170 |
| 1,655,580 | 1/1928 | Stuedeman | 198—170 |
| 1,822,797 | 9/1939 | Birmann | 198—170 |
| 2,101,685 | 12/1937 | Nisbet. | |
| 2,669,342 | 2/1954 | Neal | 198—170 X |

SAMUEL F. COLEMAN, *Primary Examiner.*

ERNEST A. FALLER, *Examiner.*